UNITED STATES PATENT OFFICE.

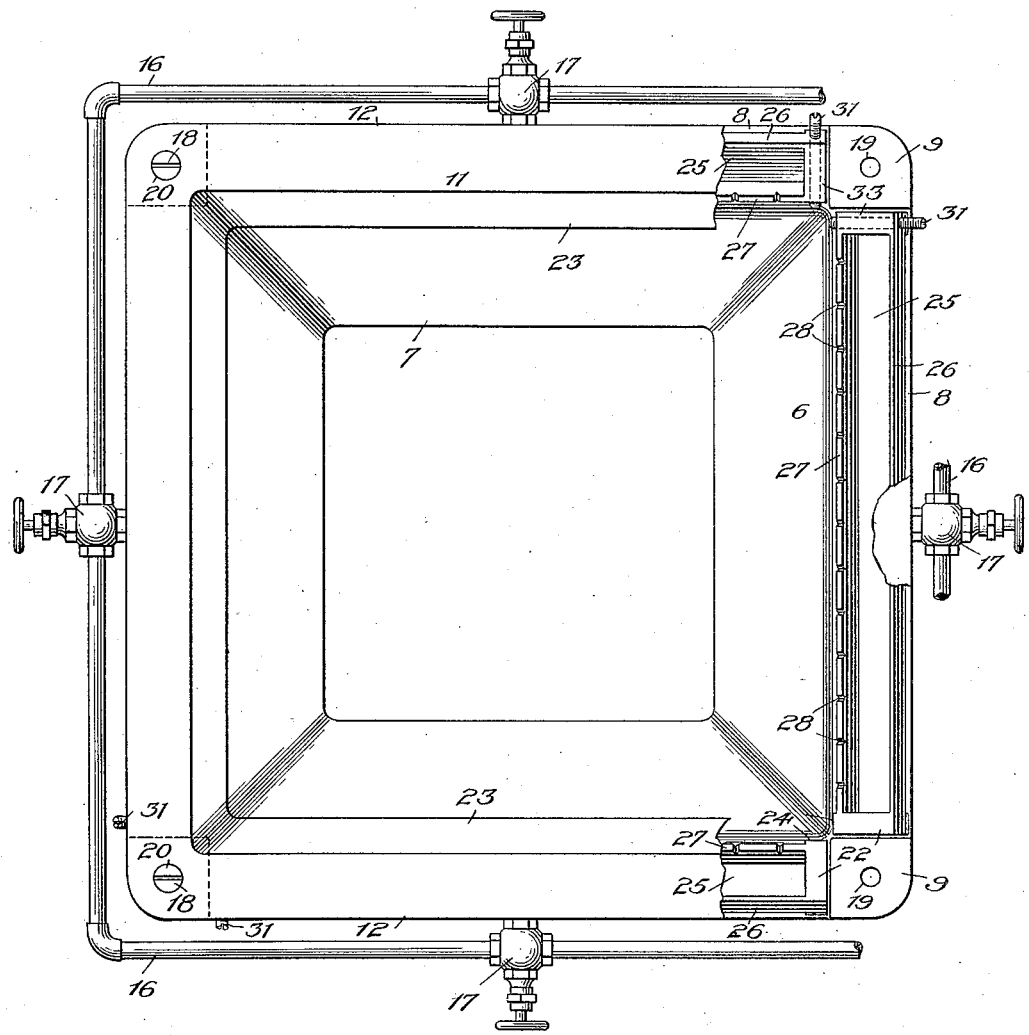

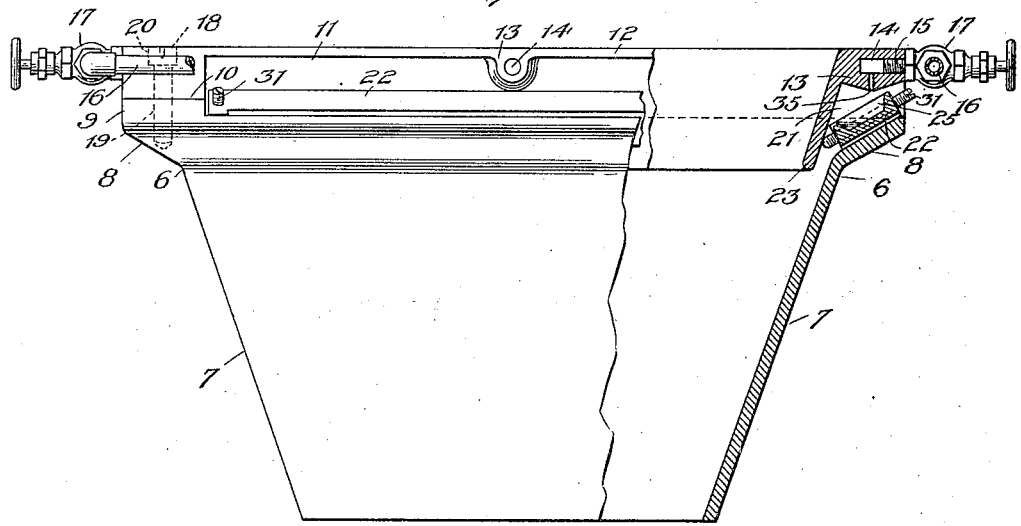
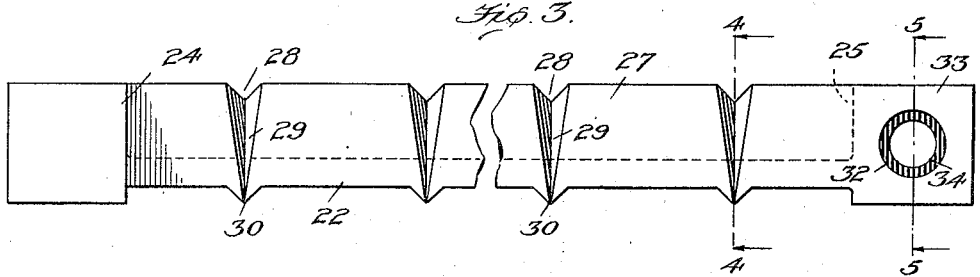
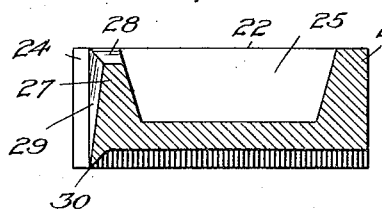
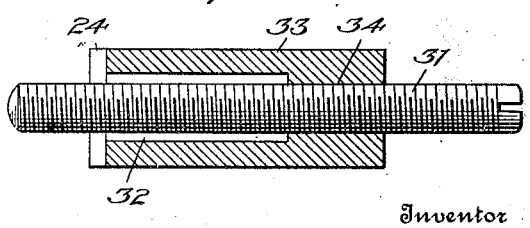

FRANK H. VAN HOUTEN, JR., OF BEACON, NEW YORK, ASSIGNOR TO DUTCHESS TOOL COMPANY, OF NEW YORK, N. Y., A CORPORATION OF NEW YORK.

OILING HOPPERS.

1,328,308. Specification of Letters Patent. Patented Jan. 20, 1920.

Application filed September 14, 1918. Serial No. 254,148.

*To all whom it may concern:*

Be it known that I, FRANK H. VAN HOUTEN, Jr., a citizen of the United States, residing at Beacon, in the county of Dutchess and State of New York, have invented certain new and useful Improvements in Oiling Hoppers; and I do hereby declare the following to be a full, clear, and exact description of the same, reference being had to the accompanying drawings, forming part of this specification.

This invention relates to an oiling device for a dough divider hopper and has for its principal object the provision of an oiling device that may be adjusted to provide an even flow of oil all around the inside face of the hopper without the necessity of adjusting the hopper itself to insure that the top of the machine is level.

A further object is the provision of an oiling trough that is easy of access, easily removed, and which can be leveled independently of the machine to which it is attached, and also independently of other similar troughs in the same machine.

A still further object is the provision of a trough for oil for a dough divider hopper that will give a more even flow of oil than the present types.

I attain these objects by the mechanism hereinafter described in this specification and illustrated in the accompanying drawings forming part of this specification, in which—

Figure 1 is a plan view of my device in its preferred form, partly broken away for convenience in illustration.

Fig. 2 is a side elevation of the same, showing one side in cross section.

Fig. 3 is a side elevation of the oiling trough.

Fig. 4 is a cross sectional view on line 4—4 of Fig. 3; and

Fig. 5 is a section on line 5—5 of Fig. 3.

In the drawing, 6 represents the hopper of an ordinary dough dividing machine and consists in a lower relatively steep section 7 and an upper section 8 at a considerably greater angle to the vertical. At each of the four corners the hopper is extended upwardly as at 9 to form supports for the bearing surfaces 10 of a plate 11 having an overhanging ledge 12 entirely covering the hopper. In the center of each of these sides the flange 12 is enlarged as at 13 to provide for the oil duct 14, into which is screwed a connection 15 joining the plate with the oil supply pipe 16 running entirely around the hopper and plate. Each of these ducts 14 is controlled by a valve 17 of the needle valve or any other desired type. This upper plate 11 is readily removable and is held in position by means of four screws 18 fitting into taps 19 bored into the enlarged corner pieces 9 of the hopper, the screws fitting in the usual smooth counterbored holes 20 in the four bearing surfaces of the upper plate.

As can best be seen from the right hand side of Fig. 2, a chamber 21 is provided between the relatively flat flange 8 of the hopper and the two sides or flanges of the plate, and in these chambers, there being one for each side, is located a trough 22 for distributing the oil drop by drop to the inner walls of the hopper. It has been found quite essential in bread-making machines to provide an even supply of oil to such surfaces as the inner surface of a dough-divider hopper and considerable difficulty has been heretofore had since it is necessary to have the hopper perfectly level in order to provide for such even flow. I secure such evenness of flow by making each of the four troughs adjustable with respect to the hopper or rather to the down-turned flange 23 of the upper plate, and for this purpose provide on one end of the hopper a positioning boss 24 which extends slightly beyond the plane of the remainder of the trough, and on the opposite end of the trough provide an adjustable means for positioning such opposite end with respect to the flange 23, thereby altering the level of oil in the reservoir 25 bounded longitudinally by the back wall 26 and the front wall 27 of the trough, the latter forming the spillway.

This front wall 27 is provided with a considerable number of small grooves 28 for guiding the oil in minute quantities to the V-shaped groove 29 in the front face of the trough, this groove ending in a pointed projection 30 extending a slight distance beyond the face of the central portion of the trough in both a horizontal and a vertical direction, forming, as it were, a sort of beak which is intended to rest directly on the face of the flange 8.

Since the trough rests upon a slanting surface, the flange 8, any movement of the end of the trough opposite the positioning boss 24 will raise or lower the grooves 28 on such opposite end, and by correct manipulation of the adjusting means each of the grooves 28 may be brought to the same level irrespective of the position, within reasonable limits, of the hopper and the relatively stationary plate 11.

The preferable form of this adjusting means is a positioning screw 31 received in a cavity 32 in the enlarged head 33 of the trough and in threaded engagement with a portion 34 thereof. As previously stated, manipulation of the screw 31 will raise or lower the end 33, so that the level of the liquid in trough 25 will be parallel to the low points of each of the grooves 28, such position insuring an even distribution of the drops of oil on the surfaces of the hopper.

In operation, oil is supplied to the system through the pipe 16 and admitted to ducts 14 through the valves 17 which are so regulated as to provide an even feed to each of the drip points 35. From here the oil flows drop by drop into the reservoir 25 of the trough until it is sufficiently high to overflow through the grooves 28. Should the oil only spill through part of the grooves 28, the adjusting screw 31 is moved so as to level the liquid so that each of the grooves 28 delivers to the hopper via point 30 the same quantity of oil. When the troughs become filled with enough flour dust which is always present where devices of this kind are used, the upper plate is removed and the troughs taken out and cleaned and replaced, or else, as shown in Fig. 2, the troughs are so proportioned as to slip out of chamber 21, without the necessity of removing the upper plate.

What is claimed is:

1. A trough for a dough divider hopper having a reservoir for liquid, a spillway, and means for leveling the trough.

2. A trough for a dough divider hopper, having a reservoir for oil, a spillway for delivering oil to the hopper, and means for adjusting the height of the oil at one end of said reservoir.

3. A trough for a dough divider hopper having a plurality of spillways, a positioning boss on one side of said spillways, and an adjustable positioning device on the other side of said spillways.

4. In combination, a hopper for dough, adjustable means for distributing oil evenly to the hopper in all positions of said hopper, and means for furnishing oil to said means.

5. In a device of the character described, a dough hopper having inclined sides, means for dripping oil evenly down the inclined sides of the hopper in one position, and adjusting means for continuing the even dripping of oil when the hopper is in another position.

6. In a device of the character described, a hopper, an oil dripping device mounted thereon, and a trough receiving oil from the dripper and distributing same evenly down the sides of the hopper, and means for adjusting one side of said trough with respect to said hopper.

7. In a device of the character described, a hopper, an oil delivering device in fixed relation to said hopper and forming a chamber therewith, and a second oil delivering device located in said chamber and adjustable with respect to said hopper.

8. In an oiling device for a dough divider hopper, a hopper, an oil conducting means for delivering oil for the hopper, and means for receiving oil from the latter and delivering it to the hopper said receiving and delivering means being movable independently of the hopper and oil conducting means into positions to deliver oil to the hopper in an even flow irrespective of the levelness of the hopper.

9. In an oiling device for a dough divider hopper, a hopper having slanting sides, oiling devices slidable on each of said sides, and means for leveling each of the oiling devices irrespective of the others.

FRANK H. VAN HOUTEN, Jr.